(12) United States Patent
Hsu

(10) Patent No.: US 7,409,087 B2
(45) Date of Patent: Aug. 5, 2008

(54) MATRIX SLICING

(75) Inventor: Siu Chi Hsu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 11/133,546

(22) Filed: May 20, 2005

(65) Prior Publication Data

US 2006/0262135 A1    Nov. 23, 2006

(51) Int. Cl.
*G06K 9/34* (2006.01)
(52) U.S. Cl. ...................................... 382/173; 382/254
(58) Field of Classification Search ................ 382/254, 382/173
See application file for complete search history.

(56) References Cited

U.S. PATENT DOCUMENTS

| | | | | | |
|---|---|---|---|---|---|
| 4,034,344 | A | * | 7/1977 | Saraga et al. | 382/257 |
| 6,606,402 | B2 | * | 8/2003 | Wagman | 382/150 |
| 6,711,293 | B1 | * | 3/2004 | Lowe | 382/219 |
| 6,751,354 | B2 | * | 6/2004 | Foote et al. | 382/224 |
| 6,801,661 | B1 | * | 10/2004 | Sotak et al. | 382/203 |
| 2003/0067459 | A1 | * | 4/2003 | Lim | 345/207 |

OTHER PUBLICATIONS

Muthukrishnan, S. et al., "On Rectangular Partitionings in Two Dimensions: Algorithms, Complexity, and Applications", *Lecture Notes in Computer Science*, 1998, 1540, 236-256, Springer-Verlag Heidelberg ISSN-0302-9743.

* cited by examiner

*Primary Examiner*—Jingge Wu
*Assistant Examiner*—Tsung-Yin Tsai
(74) *Attorney, Agent, or Firm*—Woodcock Washburn LLP

(57) ABSTRACT

A user identifies desired target elements in a two dimensional matrix. A set of interesting cuts is created. The maximum potential gain in isolated target elements for each cut in the set of interesting cuts is calculated. The cut with the greatest potential gain is applied to the matrix and removed from the set of interesting cuts. The maximum potential gain for each remaining cut in the set of interesting cuts is recalculated given the cuts applied so far. With each iteration, the cut providing the maximum potential gain is applied to the matrix, removed from the set of interesting cuts, and the maximum gain for each remaining cut is recalculated given the cuts applied to the matrix so far.

14 Claims, 6 Drawing Sheets

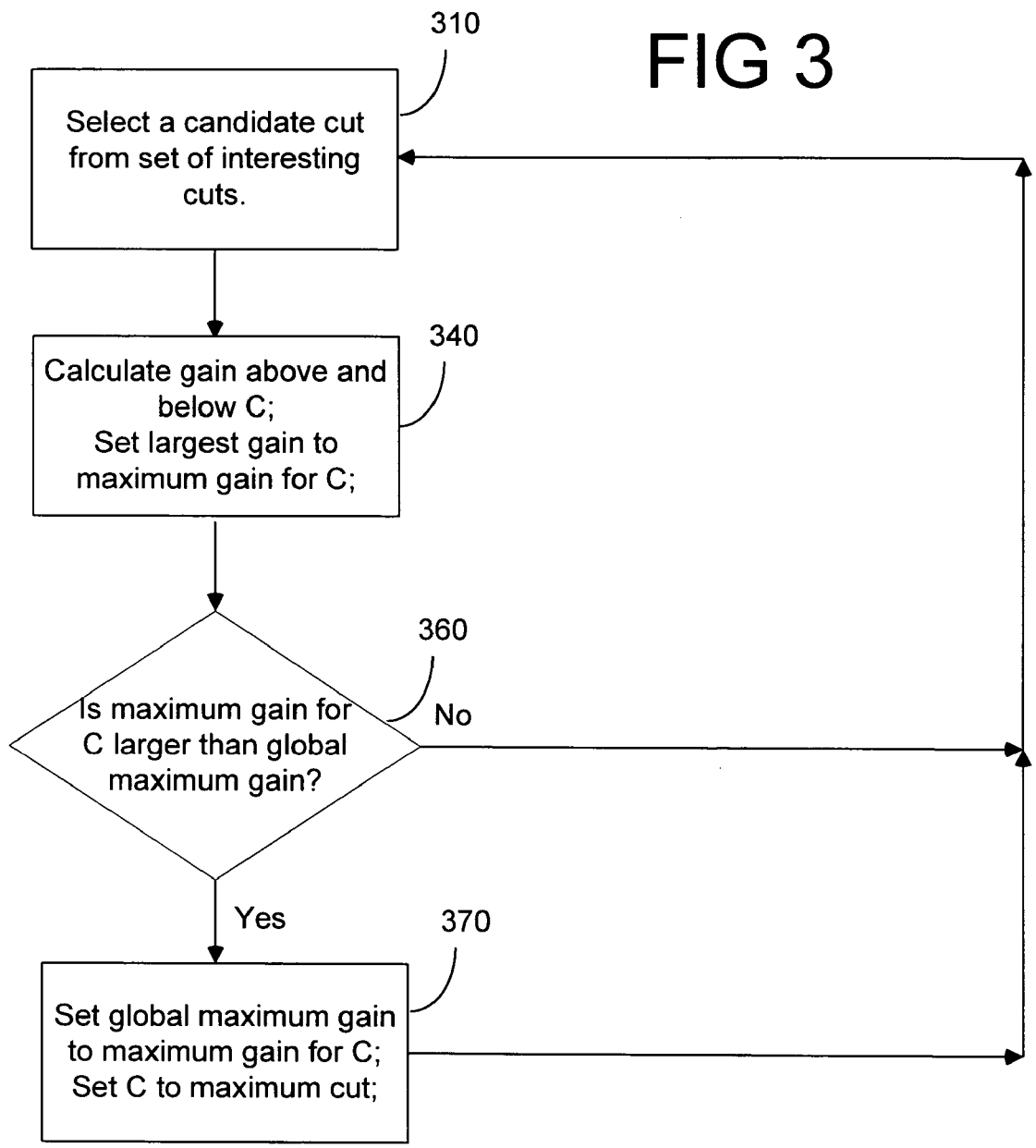

MATRIX SLICING

FIELD OF THE INVENTION

The invention relates generally to the field of matrices. More particularly, the invention relates to the isolation of target matrix elements using an optimal number of matrix cuts.

BACKGROUND OF THE INVENTION

HTML pages typically contain graphic images. These graphic images comprise a series of colored dots, or pixels. Graphic images can be represented by matrices, with each matrix element corresponding to a pixel in the image. In many cases these pixels are typically clustered together with pixels of the same or similar color. For example, in a picture taken outdoors there may be a large number of blue colored pixels clustered together for the sky, or a large number of green colored pixels clustered together for the ground.

While graphic images are important in HTML pages, they generally take up a much greater amount of memory than typical HTML data. This fact can be observed when downloading an HTML page over a slow internet connection, for example. The graphic images are always the last part of the page to load because they are of a much larger file size than the rest of the HTML page. This can become even more apparent when "roll-over" type images are used in an HTML page. Roll-over images are typically used as buttons such that when a user places the mouse cursor over one of the buttons, the button's image changes to reflect that the cursor is over it. This results in an even larger download time, because an additional roll-over image must be downloaded for each button.

Given that images tend to have similar pixels clustered together, download times can be decreased by replacing rectangular clusters of identical pixels with HTML tables containing cells of the same color. This technique can further reduce the amount of data downloaded when used in conjunction with roll-over buttons. Since buttons often comprise a general uniform color, these portions can be replaced with HTML tables. When a user places the cursor over a button, only the parts of the roll-over button that differ from the regular button are downloaded.

While replacing rectangular portions of an image with HTML tables is useful, isolating the pixels into homogeneous rectangles suitable for HTML replacement can be difficult and very time consuming. Typically, a user manually selects portions of the image to replace with table cells. This often results in sub-optimal pixel replacement, both in terms of the number of replaced pixels, and the number of table cells used to make the replacement.

Therefore, what are needed are systems and methods for the automatic isolation of target elements in matrices, such as graphic images, into homogenous rectangular regions.

SUMMARY OF THE INVENTION

A user identifies desired matrix elements in a two dimensional matrix, such as a digital image. A set of cuts is created. The maximum gain in isolated desired matrix elements for each cut in the set of cuts is calculated. The cut with the greatest gain is applied to the matrix and removed from the set of cuts. The maximum gain for each remaining cut in the set of cuts is recalculated given the cuts applied so far. With each iteration, the cut providing the maximum gain is applied to the matrix, removed from the set of cuts, and the maximum gain for each cut is recalculated given the cuts applied to the matrix so far. Cuts are applied to the matrix until the relative gains in isolated target pixels between subsequent cuts falls below an acceptable amount or the set of cuts is exhausted.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is a flow diagram illustrating an exemplary method for selecting a cut from a set of cuts that provides the maximum potential gain in isolated target matrix elements in accordance with the present invention;

DETAILED DESCRIPTION OF ILLUSTRATIVE EMBODIMENTS

Figure 1:
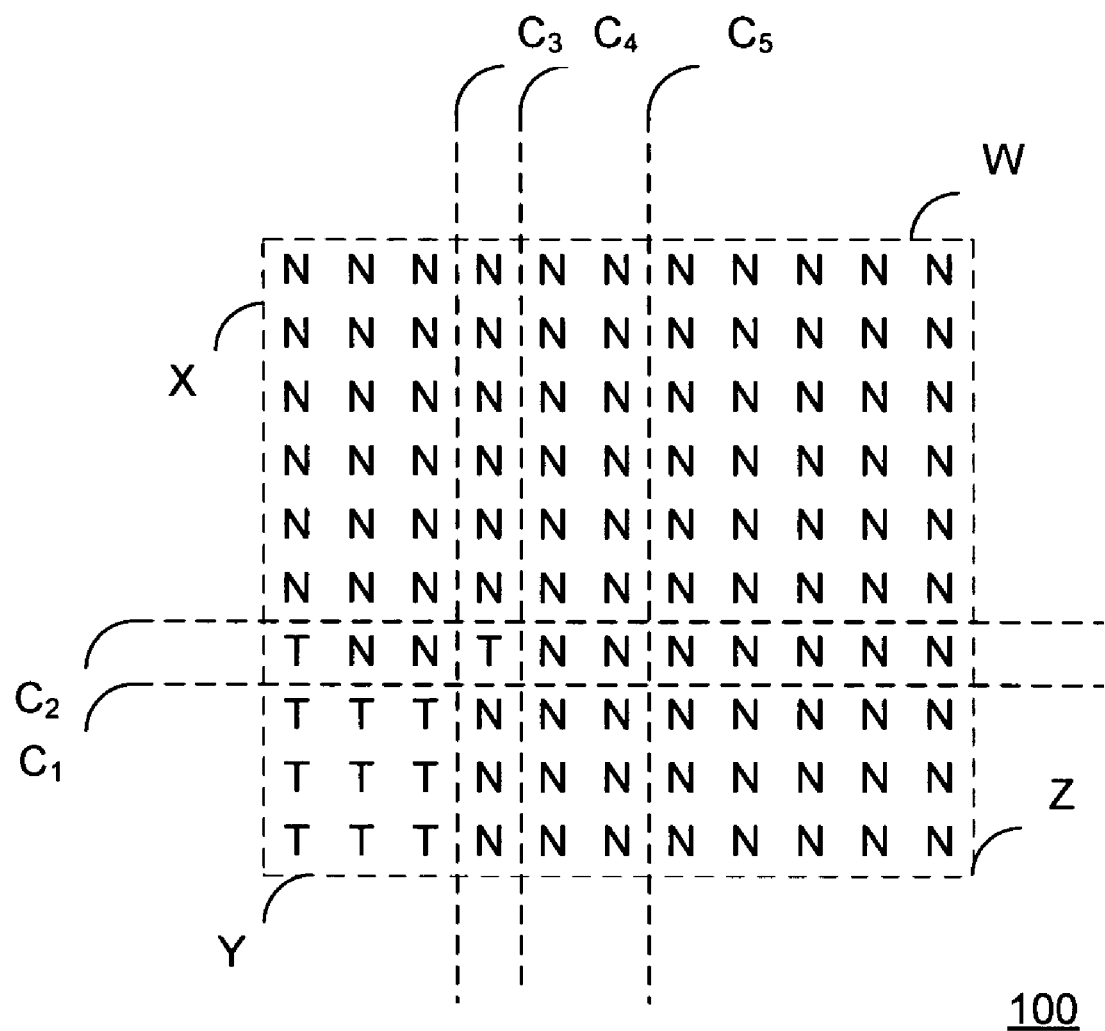
FIG. 1 is a diagram of an exemplary matrix 100 in accordance with the present invention.

FIG. 1 is a diagram of an exemplary matrix 100 in accordance with the present invention. The matrix 100 comprises a plurality of matrix elements, the matrix elements are labeled either N or T. Examples of matrices include digital images. Digital images are comprised of a plurality of pixels, with each pixel corresponding to a matrix element, for example. While the invention is described as applying to matrices that comprise images, it is not meant to limit the invention to images. The invention is applicable to any embodiment of a matrix known in the art.

A user of the matrix may wish to isolate matrix elements into rectangular heterogeneous regions. In particular, the user may wish to isolate certain matrix elements (i.e., target elements) from the rest of the matrix elements (i.e., non-target elements). Target elements are labeled on matrix 100 as T. Non-target elements are labeled on matrix 100 as N.

For example, in the cases where the matrix is an image, a user may wish to isolate all pixels of the color blue into rectangular regions. Once isolated, these rectangular regions could be replaced with HTML tables comprising blue, for example. Because images generally require a larger amount of bandwidth to transmit, replacing portions of them with HTML tables can result in considerable bandwidth savings.

In order to isolate the target matrix elements into heterogeneous rectangular regions, various cuts may be applied to the matrix. Exemplary cuts are labeled on FIG. 1 as $C_1$-$C_5$, for example. However, potential cuts are not limited to those illustrated. There exists a potential cut between every row pair and column pair shown on the matrix 100, for example.

It is desirable that the heterogeneous regions be isolated using as few cuts as possible. For example, if the matrix is an image and the goal is to replace blue pixels with HTML tables, a greater bandwidth savings can be achieved by reducing the number of HTML table cells used to replace the blue pixels. Accordingly, the fewer the number of cuts made to the image, the larger the heterogeneous rectangles, the less HTML table cells that are needed to replace the blue pixels, for example.

To minimize the number of cuts used to isolate the rectangular regions of target elements, a gain function is desirably used to select cuts from a set of possible cuts. Before applying a candidate cut, the maximum potential gain in isolated target elements is desirably calculated for that candidate cut. The gain for a candidate cut may be calculated by assigning a value of one to any target element isolated immediately on adding the candidate cut to the matrix. In addition, target elements that are isolatable by applying additional, future cuts, from the remaining cuts in the set of cuts are also assigned a value corresponding to the number of cuts required for isolation. For example, a target element that requires an additional future cut to isolate is assigned a value of two, a target element that requires two additional future cuts is assigned a value of three, and so on. The gain for a particular sequence of cuts is the sum of the inverses of all of values assigned to the isolated target elements. The cuts are desirably applied until all of the target elements are isolated.

Alternatively, instead of applying cuts until all of the target elements are isolated, the process may stop applying cuts when the gain associated with a cut is low when compared to the total gain from cuts applied to the matrix thus far. For example, if an additional cut provides the isolation of only five target elements and the previously applied cuts isolated four hundred target elements, then the relative benefit of applying the cut is small when compared to the number of target pixels isolated by the previous cuts. The relative gain of a cut may computed as a ratio between the gain of the cut and the total gain from the previously applied cuts. If the ratio falls below a certain value, then the embodiment may stop applying cuts to the matrix, for example. Similarly, the gain from a cut may compared to the average gain of cuts applied so far. If the actual gain falls below the average gain then the cut may not be applied. However, any system, method or technique for determining if a cut should be applied may be used.

To further illustrate, consider the following example. Assume the set of cuts is populated by all possible horizontal and vertical cuts. For the purposes of the algorithm, boundaries of the matrix, labeled on FIG. 1 as W, X, Y, and Z, can be considered preexisting cuts. The maximum gain algorithm is executed on the set of cuts. As described previously the maximum gain algorithm calculates the maximum number of potential target elements isolated by the introduction of a cut to the matrix. The maximum potential gain algorithm will desirably select either $C_1$ or $C_3$ as the cut that will provide the maximum gain. As shown, applying $C_1$ or $C_3$ results in the same potential gain. Neither cut alone will isolate a contiguous region of target elements, but both cuts will result in the isolation of nine target elements after the addition of one further future cut. Assume the maximum gain algorithm chooses to apply $C_1$.

After applying $C_1$, $C_1$ is desirably removed from the set of cuts, and the cut that will provide the maximum potential gain is again selected from the set of cuts. Given that $C_1$ has already been applied, the algorithm will desirably choose $C_3$ to be applied next. As illustrated, the addition of $C_3$ isolates nine target elements in the matrix.

After applying $C_3$ and removing it from the set of cuts, the algorithm will again choose the cut that produces the largest potential gain. Because there is only one remaining non-isolated target element and at least two cuts required to isolate it ($C_4$ followed by $C_2$, or vice versa), the maximum potential gain for either $C_4$ or $C_2$ may be below the minimum gain threshold for applying additional cuts. Assuming that the calculated potential gain for $C_4$ or $C_2$ is above the minimum gain threshold, either cut will be potentially chosen because they both result in the potential gain. $C_4$ results in the isolation of one target pixel with the future addition of $C_2$. Similarly, $C_2$ results in the isolation one target pixel with the future addition of $C_4$. Assume that the algorithm chooses to apply $C_4$ first. After applying $C_4$ the only remaining cut in the set of cuts that will provide any additional gain is $C_2$. Accordingly, $C_2$ is desirably applied and the algorithm may stop considering cuts.

An additional modification that can improve the efficiency is to remove some or all uninteresting cuts from the set of potential cuts before consideration by the maximum potential gain algorithm. An uninteresting cut is a cut that has the same pattern of target and non-target elements adjacent to it. For example, $C_5$ is an example of an uninteresting cut. As shown, the same pattern of matrix elements are on the left and right side of $C_5$. $C_5$, or any uninteresting cut, would never be chosen by the maximum potential gain algorithm because the maximum potential gain for such a cut could always be improved by shifting the cut until a different pattern is on adjacent sides of the cut. Accordingly, the overall performance of the method can be improved by first removing some or all uninteresting cuts from the set of cuts.

Figure 2:
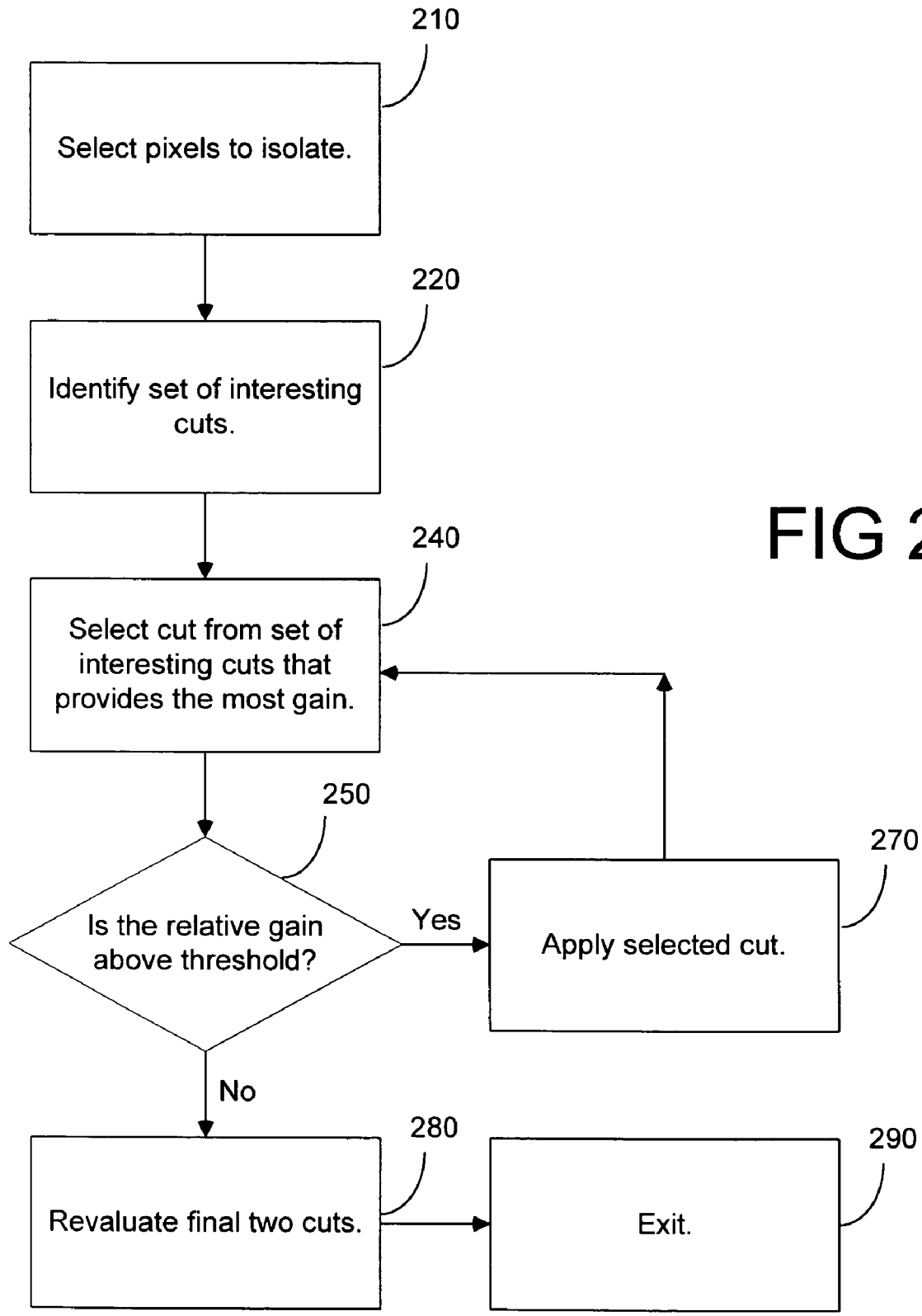
FIG. 2 is a flow diagram illustrating an exemplary method of isolating target matrix elements into rectangular regions using vertical and horizontal cuts in accordance with the present invention.

FIG. 2 is a flow diagram illustrating an exemplary method of isolating target matrix elements in a matrix into rectangular regions using horizontal and vertical cuts. A user identifies target elements in a two dimensional matrix. A set of interesting cuts is created. The maximum gain for each cut in the set of interesting cuts is calculated. The cut with the greatest gain is applied to the matrix and removed from the set of interesting cuts. The maximum gain for each remaining cut in the set of interesting cuts is recalculated given the cuts applied so far. With each iteration, the cut providing the maximum gain is applied to the matrix, removed from the set of interesting cuts, and the maximum gain for each cut is recalculated given the cuts applied to the matrix so far. The final two cuts applied to the matrix are revaluated using an exhaustive search among all possible interesting cut pairs. The pair providing the maximum gain in isolated target elements are substituted for the final two cuts. While the following description is described with respect to digital images and pixels, it is for illustration only, and not meant to limit the invention to digital images. The invention is applicable to any 2D matrix.

At 210, a user or administrator identifies a set of pixels to isolate into rectangular regions in an image. The pixels that the user wishes to isolate are known as the target pixels. For example, the user may wish to isolate rectangular regions in the image comprising white pixels. The user could later replace the isolated regions of white pixels with HTML tables saving both memory and network bandwidth, for example. In another example, the user may wish to isolate all pixels that comprise a shade of red. Any system, method, or technique known in the art for choosing the set of target pixels may be used.

At 220, after identifying the target pixels in the image, the set of possible cuts may be reduced by removing all uninteresting cuts. A cut may be considered uninteresting if that cut has an equivalent pixel pattern on either side of the cut. For example, if a candidate cut has the same pattern of target and non-target pixels on either side, then the gain of the cut will be improved by moving the cut until the patterns are unequal. Because it is desirable to isolate homogenous rectangles of target pixels in as few cuts as possible and a cut that has an equal pattern of target and non-target pixels on either side of it can always be shifted parallelly by one row (or column if it is a vertical one) in toward one of the two sideway directions or removed altogether and achieve in an increase (or at worst no change) in the number of pixels isolated. Therefore such a cut is never worth making and any uninteresting cuts are desirably discarded. Any system, method, or technique known in the art for identifying uninteresting cuts can be used. Note that while the removal of uninteresting cuts improves efficiency by reducing the overall number of cuts that must be considered by the maximum potential gain function, as described with respect to FIG. 3, removing some or all of the uninteresting cuts is not strictly necessary for the invention.

At 240, the cut from the set of cuts that provides the greatest amount of gain is selected. How the potential gain for a cut is calculated may depend on the number of remaining cuts in the set of cuts. FIG. 3 describes the maximum potential gain algorithm for calculating the maximum potential gain for a particular candidate cut. Using the maximum potential gain algorithm provides a near optimal choice for a candidate cut, while avoiding a costly brute force exhaustive search among the candidate cuts.

At 250, the cut providing the maximum potential gain from the set of cuts has been selected. However, before applying the cut the max potential gain from applying the cut is desirably compared with the overall total gain from the previous cuts taking into account of the total number of cuts employed so far. For example, if the application of the cut only potentially provides the isolation of a certain number, N, of target pixels, and N is relatively small compared to the overall total number of pixels isolated so far or N is relatively small compared to the average number of pixels isolated per cuts made so far, then it may not worth introducing that new cut because the marginal gain is relative insignificant, and no more extra cuts will be considered. The exact criteria of this test depends on the particular application of the invention and any system, method, or technique for determining this marginal gain and the any choice of threshold value for this marginal gain can be used. When such termination criteria based on the maximum potential gain of the newly selected cut, the overall total gain so far and the total number of cuts employed so far is reached, then the cut will not be applied and the embodiment may continue at 280. Otherwise the cut is desirably applied to the image at 270 and the embodiment may return to 240 to select the next cut to apply. Else, the embodiment may continue at 280.

At 280, the final two cuts applied to the image are desirably reevaluated and the pair of cuts from the set of candidate cuts that that isolates the greatest number of target pixels is substituted. Because the scores computed by the maximum potential gain function are based on the availability of some future cuts, such evaluation based on longer term rewards would become less accurate for the final few cuts. Therefore, the final two cuts are revised by running a full exhaustive evaluation of the actual gain from all possible pairs of candidate cuts. The pair of cuts that isolates the maximum number of target pixels is used instead. After revising the final two cuts, the embodiment may exit at 290.

FIG. 3 is a flow diagram illustrating an exemplary method of identifying a cut from a set of cuts that provides the maximum amount of gain. A horizontal cut is selected from the set of candidate cuts. The gain from the applying the cut is calculated between the cut and the nearest existing cut above, and between the cut and the nearest existing cut below. The maximum gain for the cut is set to the larger of the two calculated gains. If the gain for the cut is greater than the highest previously calculated cut, then the cut becomes the maximum gain cut. The method is repeated for each cut in the set of cuts. While FIG. 3 is described with respect to calculating the maximum gain for a horizontal cut, it is not meant to limit the invention to horizontal cuts only. Those skilled in the art will appreciate that the method described can be applied equally to selecting vertical cuts.

At 310, a candidate cut ('C') is desirably selected from the set of cuts. As described previously, this set of cuts may have been reduced by removing some or all uninteresting cuts from the set of possible cuts. While removing uninteresting cuts improves the efficiency of the algorithm, it is not necessary to remove uninteresting cuts.

At 340, the maximum possible gain on introducing cut C is desirably calculated. As shown on FIG. 1, any rectangular image has four edges W, X, Y, and Z. Therefore, any cut applied to the image will form two rectangular regions. An upper region is formed above C with the boundaries being C and the closest of any previously applied cuts or the edges W, X, Y, and Z, and a lower region is formed below C with the boundaries being C and the closest of any previously applied cuts or the edges W, X, Y, and Z. In order to calculate the maximum gain attributable to C, the maximum gain is desirably computed for both the lower and the upper regions.

For the region above C, each horizontal cut from the set of candidate cuts between C and the nearest existing preexisting matrix cut is considered. The maximum gain for the region attributable to C is desirably calculated by considering the potential value in isolated target pixels isolated for each cut from the set of cuts between C and the horizontal boundary of that region and the potential value in isolated target pixels by applying C alone. The maximum gain for C in the region above C is the highest calculated potential value of all of the considered cuts between C and the boundary, as well as C alone.

Each target pixel between C and the upper boundary that is immediately isolated by C is given a value of 1. Each target pixel between C and the upper boundary that requires an additional vertical cut to isolate is given a value of 2. Each target pixel between C and the upper boundary that requires two additional vertical cuts is given a score of 3, and so forth.

However, as the additional cuts from the set of cuts between C and the upper boundary are considered, the potential value of isolated target pixels attributable to C is desirably reevaluated. For example, after the introduction of the additional cut, any potentially isolatable pixels attributed to C that lie between the additional cut and the upper boundary should be no longer attributed to C for the purposes of the gain calculation. In addition, any pixels between the additional cut and C that are now isolated or isolatable (i.e., after the addition of some number of future vertical cuts) should be included in the gain calculation. Further, any target pixels between C and the additional cut that were isolated or isolatable prior to the addition of the additional cut should have their value increased by 1 since they now require an additional cut to isolate.

Finally, the gain attributable to C plus the additional cut is calculated by summing the inverse of the scores assigned to the target pixels. The maximum gain for the region above C is set to the highest calculated gain for each of the cut combinations.

Figure 4A:
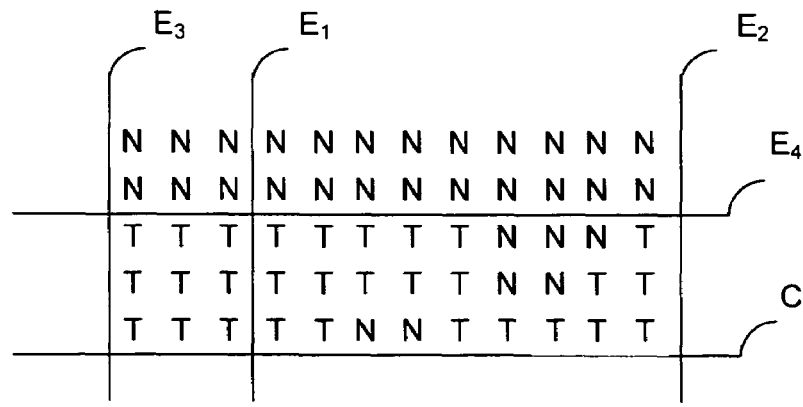
FIG. 4a is an illustration of a section of an exemplary matrix in accordance with the present invention.
Figure 4B:
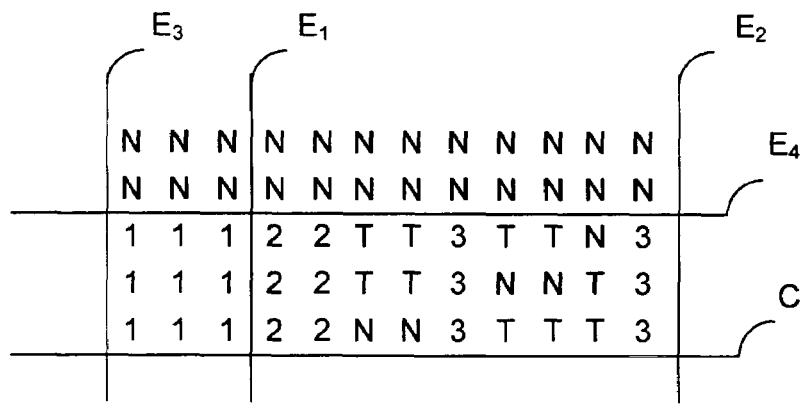
FIG. 4b is an illustration of a section of an exemplary matrix in accordance with the present invention.
Figure 4C:
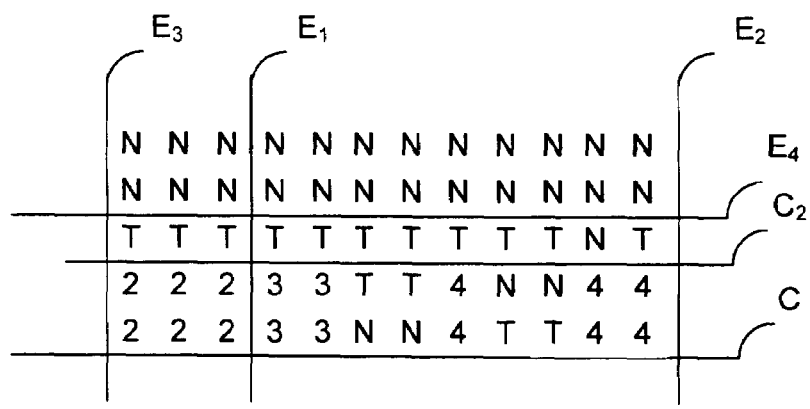
FIG. 4c is an illustration of a section of an exemplary matrix in accordance with the present invention.

For example, consider the illustration in FIG. 4. An exemplary section of a matrix is shown in FIG. 4a. The matrix comprises a plurality of target pixels labeled T, and a plurality of non-target pixels labeled N. The matrix comprises existing vertical cuts $E_1$-$E_3$, and existing horizontal cut $E_4$. For the purposes of this example, consider the candidate cut C.

As shown in 4b, with addition of cut C, the isolated and isolatable target pixels can be assigned a score. The target pixels labeled 1 are isolated immediately by adding C. The target pixels labeled 2 are isolatable after the introduction of an additional vertical cut. Similarly, the pixels labeled 3 are isolatable after the addition of two additional vertical cuts. The gain is the sum of the inverses of the assigned pixel scores. As shown the calculated gain for C alone is 9(1/1)+6(1/2)+6(1/3)=14.

As described above, in order to calculate the maximum potential gain for cut C. The gain in isolated and potentially isolatable pixels is calculated for C, plus each additional cut from the set of future cuts between C and the uppermost existing cut. The gain is the sum of the inverses of the assigned pixel scores. The highest calculated gain for C is set to the maximum potential gain. However, the gain is further compared to gain attributable to C alone, and only used if it greater than the gain from C alone.

4c illustrates the gain attributable to C with the addition of $C_2$. As shown, after the addition of $C_2$, the score for the isolated and isolatable pixels associated with C is desirably revised. For example, the isolated and isolatable pixels above $C_2$ are no longer scored because they are attributable to $C_2$, and not C. Similarly, the scores of the isolated and isolatable pixels originally attributable to C below $C_2$ are all increased by one, because they now require an additional cut $C_2$ to isolate. In addition, with the introduction of $C_2$ several target pixels that were not isolatable before are now isolatable with the introduction of future vertical cuts. Thus, the gain attributable to C after the addition of $C_2$ is 6(1/2)+4(1/3)+6(1/4), or 5.8333. Because the gain attributable to C after the addition of $C_2$ (5.8333) is less than the calculated gain from applying C alone (14), if the algorithm were to stop now, the gain attributable to C alone would be the maximum potential gain for C on this side.

The gain attributable to C after the addition of each horizontal cut between C and $E_4$ is calculated in same way as described in the example above. The largest calculated gain is set to the maximum gain for cut C in the region above C.

The maximum potential gain for the region below C is calculated in the same manner as described above, by considering the additional cuts from the set of potential cuts between C and the closest preexisting cut below C (not shown).

After calculating the maximum possible gain for each of the upper and lower regions for C, the largest of calculated gains for the two regions is set to the maximum gain for C, for example.

At 360, the maximum possible gain attributable to C is desirably compared with the maximum possible gain attributable to other cuts in the set of cuts. The maximum possible gain thus far attributable to a cut from the set of cuts may be stored in a variable or other data structure, for example. If the maximum gain attributable to C is larger than a previously determined maximum possible gain, then the embodiment desirably continues to 370. Else, the next candidate cut is selected from the set of cuts at 310.

At 370, it has been determined that C provides a greater maximum possible gain than any previously selected cut from the set of cuts. Accordingly, the variable associated with the highest maximum possible gain calculated thus far is desirably set to the maximum possible gain calculated for C. In addition, C is desirably set aside such that, if no cut is found to provide a greater maximum gain, C can be applied to the image or matrix, for example.

Figure 5:
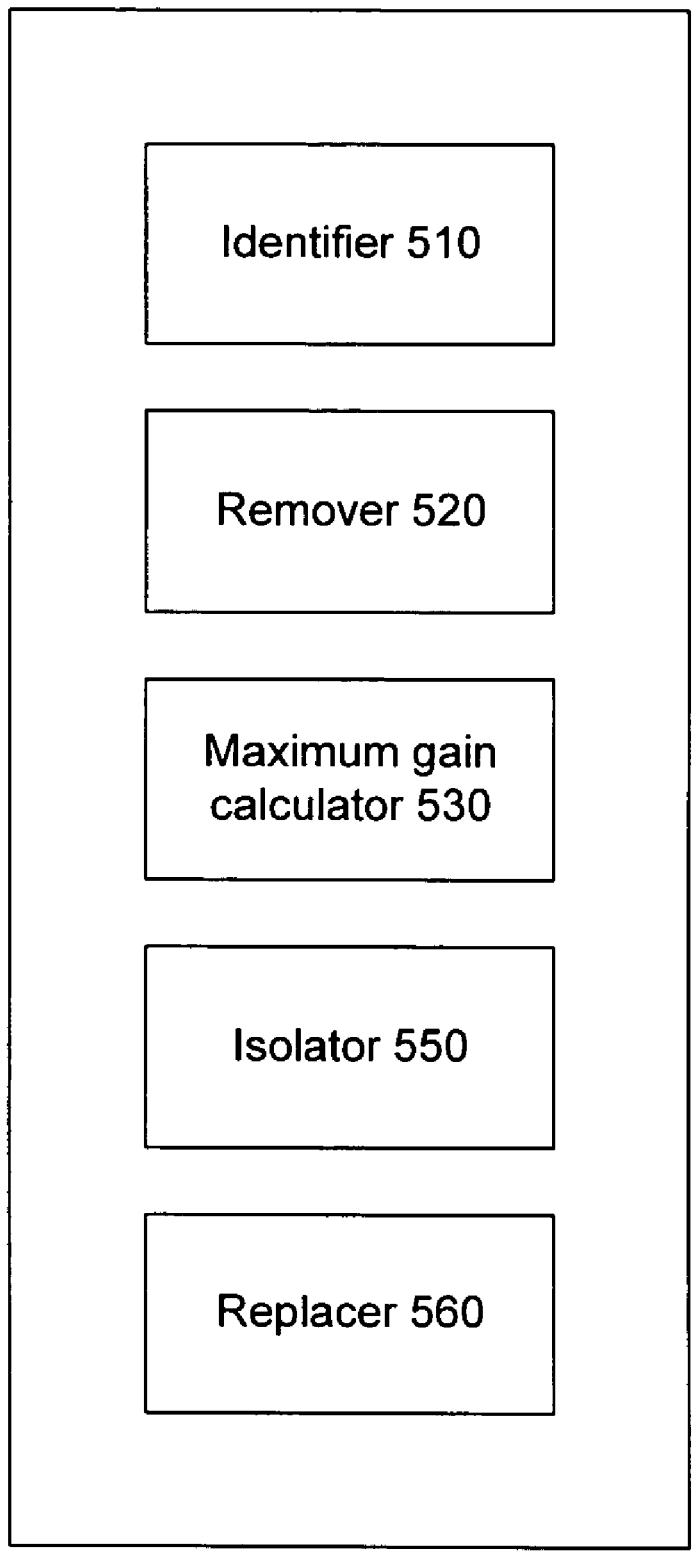
FIG. 5 is a block diagram illustrating components of an exemplary target matrix isolation system in accordance with the present invention.

FIG. 5 is block diagram of an exemplary system for isolating target matrix elements in a matrix in accordance with the present invention. The system includes several means, devices, software, and/or hardware for performing functions, including an identifier 510, a remover 520, a maximum gain calculator 530, an isolator 550, and a replacer 560.

The identifier 510 identifies target matrix elements and non-target matrix elements in a matrix. As described with respect to FIG. 1, a matrix comprises matrix elements. A user or administrator may specify a condition or rule for separating target or non-target elements. Using the rule, the matrix elements are automatically identified as either target or non-target elements. For example, in a particular matrix, such as an image, the matrix elements may comprise pixels. A user or administrator may specify that the target elements are those pixels that are blue. Accordingly, the blue pixels in the image that correspond to the color blue are identified and categorized as target pixels, while the remaining pixels are categorized as non-target pixels. In an alternative embodiment, the system may automatically determine which elements are target elements and which elements are non-target elements, for example. The identifier 510 can be implemented using any suitable system, method or technique known in the art for identifying target and non-target matrix elements. The identifier 510 can be implemented using software, hardware, or a combination of both.

The remover 520 determines the uninteresting cuts and removes them from the set of candidate matrix cuts. As described previously, to isolate the target matrix elements into homogenous rectangular sections in the matrix, a sequence of horizontal and vertical cuts are applied to the matrix. Initially, the set of potential matrix cuts comprises every potential cut between adjacent rows and columns of the matrix. While not necessary for the performance of the invention, the efficiency can be improved by removing any cuts from the set of cuts that are uninteresting. A cut is uninteresting if the pattern of target and non-target elements on adjacent sides of the cut are identical. Because the pattern of target and non-target elements are identical, applying an uninteresting cut will not result in an efficient isolation of target elements because the cut could always be improved shifting it parallelly by one row (or column if it is a vertical cut) or removed altogether and achieve an increase (or at worse no change) in the number of pixels isolated. The remover 520 can be any implemented using any suitable system, method or technique known in the art for identifying and removing uninteresting cuts. The remover 520 can be implemented using software, hardware, or a combination of both.

The maximum gain calculator 530 determines the cut in the set of matrix cuts that results in the maximum potential gain in isolated target matrix elements. Each cut in the set of cuts may be analyzed using a maximum potential gain function as described with respect to FIG. 3, for example. The maximum potential gain for a cut is calculated using a weighted sum of the target elements attributable to C that are isolated immediately on adding the cut to the matrix with those target elements that may be isolated by some number of future cuts from the set of cuts. Any system, method, or technique known in the art for determining the maximum potential gain for a matrix cut may be used. The maximum gain calculator 530 may be implemented using software, hardware, or a combination of both.

The isolator 550 applies the selected cuts to the matrix creating isolated rectangular regions of target matrix elements. The isolator 550 desirably isolates the rectangular regions by iteratively applying the cut with the highest potential gain as selected by the maximum gain calculator 530. After applying a selected cut the isolator 550 desirably removes the cut from the set of cuts and applies the next cut selected by the maximum gain calculator 530 from the modified set of matrix cuts. The isolator 550 may apply cuts until the set of cuts has been exhausted, or after the ratio between the maximum gain in isolated target elements of a cut and the total number of isolated target elements from previously applied cuts falls below a predetermined ratio. For example, if the maximum potential gain in isolated target pixels from applying a cut is small relative to the overall gain in isolated pixels from applying the previous cuts there may be little additional benefit in applying the cut and no further cuts may be applied. Similarly, if the maximum potential gain for a cut falls below the average gain for previously applied cuts that cut may not be applied. Any system, method, or technique known in the art for isolating rectangular regions in a matrix may be used The isolator 550 may be implemented using software, hardware, or a combination of both.

The replacer 560 replaces the isolated homogenous regions of target elements in the matrix. As described previously with respect to FIG. 2, an embodiment of the invention can be used to isolate and remove target pixels from matrices comprising images. In particular, the isolated regions of target pixels can be replaced with HTML table cells of the same color as the target pixels. Replacing the target pixels with HTML results in a greater efficiency of storage because images require a much larger storage space than HTML, as well as a greater efficiency of network resources because images require a greater amount of bandwidth than HTML. The replacer 560 desirably generates an HTML table comprising cells corresponding in shape, size, and color to the isolated regions of target pixels. The isolated regions may then be removed and replaced with the generated HTML table. Any system, method, or technique known in the art for generating HTML tables corresponding to rectangular regions of isolated pixels may be used. The replacer 560 may be implemented using software, hardware, or a combination of both.

Exemplary Computing Environment

Figure 6:
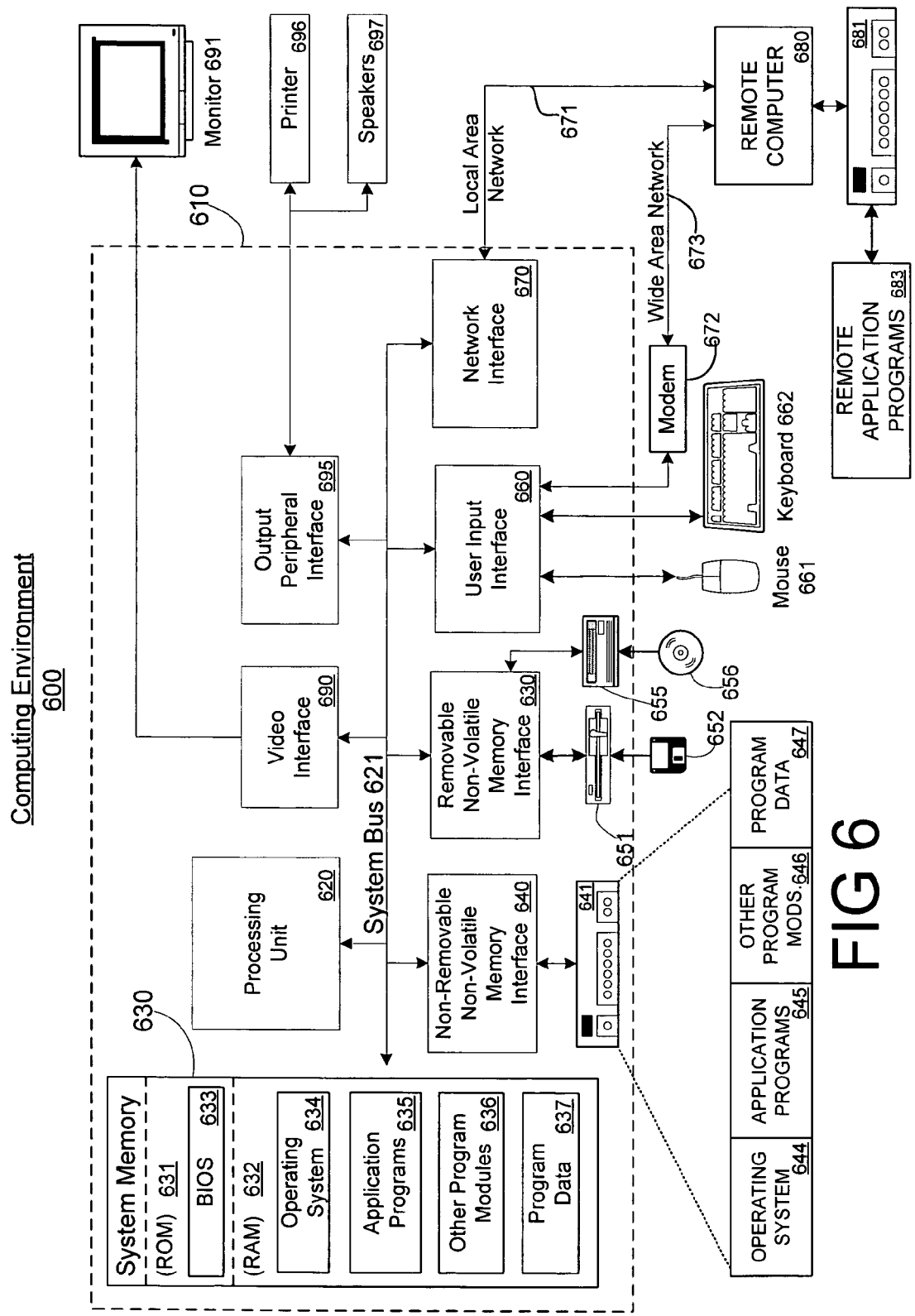
FIG. 6 is a block diagram showing an exemplary computing environment in which aspects of the invention may be implemented.

FIG. 6 illustrates an example of a suitable computing system environment 600 in which the invention may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 610 typically includes a variety of computer readable media. Computer readable media can be any available media that can be accessed by computer 610 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or non-volatile memory such as ROM 631 and RAM 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/non-volatile computer storage media. By way of example only, FIG. 6 illustrates a hard disk drive 640 that reads from or writes to non-removable, non-volatile magnetic media, a magnetic disk drive 651 that reads from or writes to a removable, non-volatile magnetic disk 652, and an optical disk drive 655 that reads from or writes to a removable, non-volatile optical disk 656, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted include a LAN 671 and a WAN 673, but may also include other networks. Such networking environments are commonplace in offices, enterprise-wide computer networks, intranets and the internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 683 as residing on memory device 681. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for isolating target elements in a matrix, comprising:

identifying target matrix elements in a matrix to isolate, wherein the matrix comprises target and non-target matrix elements;

calculating the potential gain of isolated target matrix elements for each cut from a set of matrix cuts by:

selecting a horizontal cut from the set of matrix cuts;

for each remaining cut from the set of matrix cuts between the selected cut and the nearest existing cut above the selected cut;

determining the number of isolated and isolatable target matrix elements above the selected cut and the nearest existing cut above the selected cut attributable to introducing the selected cut to the matrix;

determining the number of isolated and isolatable target matrix elements above the selected cut and the nearest existing cut above the selected cut attributable to introducing the remaining cut to the matrix;

assigning a score to each isolated and isolatable target matrix element attributable to introducing the selected cut to the matrix, wherein the score is proportional to the number of additional vertical cuts required to isolate each isolated or isolatable target matrix element; and summing the inverse of each score assigned to each isolated and isolatable target matrix element;

setting the potential gain of isolated target matrix elements above the selected cut to the highest calculated sum;

calculating the potential gain of isolated target matrix elements below the selected cut;

selecting the highest calculated potential gain as the potential gain of isolated target elements for the selected cut; and applying the matrix cut from the set of matrix cuts with the greatest calculated potential gain.

2. The method of claim 1, further comprising removing the applied matrix cut from the set of matrix cuts.

3. The method of claim 1, further comprising revaluating the final pair of matrix cuts applied to the matrix by calculating the actual gain of isolated target matrix elements for each pair of cuts in the set of matrix cuts, and applying the pair with the greatest calculated gain.

4. The method of claim 1, wherein applying the matrix cut from the set of matrix cuts with the greatest calculated potential gain comprises:

calculating a ratio between the potential gain of the matrix cut with the greatest calculated potential gain and the total number of isolated target matrix elements from previously applied matrix cuts, if any; and applying the matrix cut only if the calculated ratio is greater than a threshold ratio.

5. The method of claim 1, wherein applying the matrix cut from the set of matrix cuts with the greatest calculated potential gain comprises:

calculating an average gain of isolated target pixels for previously applied matrix cuts, if any; and applying the matrix cut with the greatest calculated potential gain only if the calculated potential gain is above the average calculated gain.

6. The method of claim 1, wherein the matrix comprises an image file, and the matrix elements comprise pixels.

7. The method of claim 1, wherein the set of cuts comprises all possible matrix cuts.

8. The method of claim 1, further comprising removing uninteresting cuts from the set of cuts, wherein a cut is uninteresting if the patterns of target matrix elements on adjacent sides of the cut are equivalent.

9. The method of claim 1, wherein the matrix elements comprise pixels, and further comprising replacing the isolated target pixels with HTML table cell.

10. A computer-readable medium with computer-executable instructions stored thereon for:

identifying target matrix elements in a matrix to isolate, wherein the matrix comprises target and non-target matrix elements;

calculating the potential gain of isolated target matrix elements for each cut from a set of matrix cuts by:

selecting a horizontal cut from the set of matrix cuts:

calculating the potential gain of isolated target matrix elements above the selected cut;

for each remaining cut from the set of matrix cuts between the selected cut and the nearest existing cut below the selected cut;

determining the number of isolated and isolatable target matrix elements below the selected cut and the nearest existing cut below the selected cut attributable to introducing the selected cut to the matrix;

determining the number of isolated and isolatable target matrix elements below the selected cut and the nearest existing cut below the selected cut attributable to introducing the remaining cut to the matrix;

assigning a score to each isolated and isolatable target matrix element attributable to introducing the selected cut to the matrix, wherein the score is proportional to the number of additional vertical cuts required to isolate each isolated or isolatable target matrix element; and summing the inverse of each score assigned to each isolated and isolatable target matrix element;

setting the potential gain of isolated target matrix elements above the selected cut to the highest calculated sum;

selecting the highest calculated potential gain as the potential gain of isolated target elements for the selected cut; and applying the matrix cut from the set of matrix cuts with the greatest calculated potential gain.

11. The computer-readable medium of claim 10, further comprising removing the applied matrix cut from the set of matrix cuts.

12. The computer-readable medium of claim 10, wherein applying the matrix cut from the set of matrix cuts with the greatest calculated potential gain comprises computer-executable instructions for:

calculating a ratio between the potential gain of the matrix cut with the greatest calculated potential gain and the total number of isolated target matrix elements from previously applied matrix cuts, if any; and applying the matrix cut only if the calculated ratio is greater than a threshold ratio.

13. A system for isolating target matrix elements in a matrix, the system comprising:

identifying means for identifying target matrix elements in a matrix to isolate, wherein the matrix comprises target and non-target matrix elements;

maximum gain calculating means for calculating the potential gain of isolated target matrix elements for each cut from a set of matrix cuts by:

selecting a horizontal cut from the set of matrix cuts;

for each remaining cut from the set of matrix cuts between the selected cut and the nearest existing cut above the selected cut;

determining the number of isolated and isolatable target matrix elements above the selected cut and the nearest existing cut above the selected cut attributable to introducing the selected cut to the matrix;

determining the number of isolated and isolatable target matrix elements above the selected cut and the nearest existing cut above the selected cut attributable to introducing the remaining cut to the matrix;

assigning a score to each isolated and isolatable target matrix element attributable to introducing the selected cut to the matrix, wherein the score is proportional to the number of additional vertical cuts required to isolate each isolated or isolatable target matrix element; and summing the inverse of each score assigned to each isolated and isolatable target matrix element;

setting the potential gain of isolated target matrix elements above the selected cut to the highest calculated sum;

calculating the potential gain of isolated target matrix elements below the selected cut;

selecting the highest calculated potential gain as the potential gain of isolated target elements for the selected cut; and isolating means for applying the cut from the set of matrix cuts that results in the maximum potential gain in isolated target matrix elements, wherein applying the cut divides the matrix into homogeneous regions of target and non-target matrix elements.

14. The system of claim 13, wherein the matrix is an image and the matrix elements comprise pixels, further comprising:

replacing means for replacing the homogenous regions of target pixels with HTML table cells.

* * * * *